(12) United States Patent
Niizuma

(10) Patent No.: US 9,109,503 B2
(45) Date of Patent: Aug. 18, 2015

(54) WASTE HEAT RECOVERY DEVICE

(75) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 13/807,636

(22) PCT Filed: Apr. 25, 2011

(86) PCT No.: PCT/JP2011/060066
§ 371 (c)(1),
(2), (4) Date: Dec. 28, 2012

(87) PCT Pub. No.: WO2012/005046
PCT Pub. Date: Jan. 12, 2012

(65) Prior Publication Data
US 2013/0098034 A1   Apr. 25, 2013

(30) Foreign Application Priority Data

Jul. 8, 2010   (JP) ................................. 2010/155456

(51) Int. Cl.
| | |
|---|---|
| F02B 33/44 | (2006.01) |
| F02B 39/10 | (2006.01) |
| H02P 9/04 | (2006.01) |
| F01N 5/02 | (2006.01) |
| F02B 33/40 | (2006.01) |
| F02B 37/00 | (2006.01) |

(52) U.S. Cl.
CPC . F02B 39/10 (2013.01); F01N 5/02 (2013.01); F02B 33/40 (2013.01); F02B 37/00 (2013.01); Y02T 10/16 (2013.01)

(58) Field of Classification Search
CPC .......... F02B 33/40; F02B 37/00; F02B 39/10; F02B 37/10; Y02T 10/16; F01N 5/02; F01N 5/025; F01D 15/10; H02K 33/00; H02K 7/1823; H02P 27/06
USPC .................... 60/607–609, 598; 290/40 C, 52; 318/803, 71, 124
See application file for complete search history.

(56) References Cited

U.S. PATENT DOCUMENTS

| | | | | |
|---|---|---|---|---|
| 4,211,932 A | * | 7/1980 | Geary, Jr. .......................... | 290/52 |
| 4,757,686 A | * | 7/1988 | Kawamura et al. ............. | 60/608 |
| 4,886,978 A | * | 12/1989 | Kawamura ...................... | 290/52 |

(Continued)

FOREIGN PATENT DOCUMENTS

| | | |
|---|---|---|
| JP | 01-121514 A | 5/1989 |
| JP | 04-159422 A | 6/1992 |

(Continued)

OTHER PUBLICATIONS

English machine translation, description, JP 09032567 A, Feb. 10, 2014.*

(Continued)

*Primary Examiner* — Thai Ba Trieu
*Assistant Examiner* — Jason T Newton
(74) *Attorney, Agent, or Firm* — Griffin & Szipl, P.C.

(57) ABSTRACT

There is disclosed a waste heat recovery device including a turbine 1 driven by an exhaust gas and a compressor 8 which compresses a gas, comprising: a generator 2 which generates electric power by rotation of the turbine 1; an electric motor 7 which rotationally drives the compressor 8; and a control device 17 which drives the electric motor 7 by using the electric power generated by the generator 2 as a power source.

6 Claims, 4 Drawing Sheets

(56) References Cited

U.S. PATENT DOCUMENTS

| | | | |
|---|---|---|---|
| 5,038,566 A * | 8/1991 | Hara | 60/608 |
| 5,105,624 A * | 4/1992 | Kawamura | 60/608 |
| 6,023,135 A * | 2/2000 | Gilbreth et al. | 318/140 |
| 6,029,452 A | 2/2000 | Halimi et al. | |
| 6,647,724 B1 * | 11/2003 | Arnold et al. | 60/608 |
| 6,958,550 B2 * | 10/2005 | Gilbreth et al. | 290/52 |
| 7,336,000 B2 * | 2/2008 | Stahlhut et al. | 290/52 |
| RE40,713 E * | 5/2009 | Geis et al. | 318/140 |
| 7,541,687 B2 * | 6/2009 | Stahlhut et al. | 290/52 |
| 7,921,944 B2 * | 4/2011 | Russell et al. | 180/65.265 |
| 8,210,292 B2 * | 7/2012 | Russell et al. | 180/65.265 |
| 8,584,459 B2 * | 11/2013 | Richards | 60/608 |
| 2004/0245783 A1 * | 12/2004 | Gilbreth et al. | 290/52 |
| 2006/0066112 A1 * | 3/2006 | Geis et al. | 290/52 |
| 2006/0071477 A1 * | 4/2006 | Yang et al. | 290/52 |
| 2006/0260305 A1 * | 11/2006 | Ishiwatari | 60/599 |
| 2007/0151241 A1 * | 7/2007 | Arnold | 60/605.1 |
| 2007/0210583 A1 * | 9/2007 | Stahlhut et al. | 290/52 |
| 2007/0246942 A1 * | 10/2007 | Stahlhut et al. | 290/40 A |
| 2009/0107142 A1 * | 4/2009 | Russell et al. | 60/608 |
| 2010/0018203 A1 * | 1/2010 | Richards | 60/598 |
| 2010/0146968 A1 * | 6/2010 | Simpson et al. | 60/605.2 |
| 2011/0088669 A1 * | 4/2011 | Russell et al. | 123/564 |
| 2011/0094224 A1 * | 4/2011 | Sheidler et al. | 60/605.2 |
| 2011/0094485 A1 * | 4/2011 | Vuk et al. | 123/568.21 |
| 2011/0094486 A1 * | 4/2011 | Vuk | 123/568.21 |
| 2013/0220116 A1 * | 8/2013 | Quix et al. | 95/14 |
| 2014/0015257 A1 * | 1/2014 | Dobbs | 290/40 B |

FOREIGN PATENT DOCUMENTS

| | | | | |
|---|---|---|---|---|
| JP | 07-102990 A | | 4/1995 | |
| JP | 09-032567 A | | 2/1997 | |
| JP | 09032567 A | * | 2/1997 | F02B 41/10 |
| JP | 09-074611 A | | 3/1997 | |
| JP | 2000-500544 A | | 1/2000 | |
| JP | 2004-316558 A | | 11/2004 | |
| JP | 2005534854 A | | 11/2005 | |
| JP | 2006-029236 A | | 2/2006 | |
| JP | 2006-322425 A | | 11/2006 | |
| JP | 2007-211634 A | | 8/2007 | |
| WO | 97/18388 A1 | | 5/1997 | |
| WO | 2004011790 A1 | | 2/2004 | |

OTHER PUBLICATIONS

International Search Report issued in corresponding application PCT/JP2011/060066, completed Jun. 29, 2011 and mailed Jul. 12, 2011.

Office Action issued in priority Japanese application 2010-155456 on Sep. 10, 2014.

* cited by examiner

WASTE HEAT RECOVERY DEVICE

This is a National Phase Application in the United States of International Patent Application No. PCT/JP2011/060066 filed Apr.25, 2011, which claims priority on Japanese Patent Application No. 2010/155456, filed Jul.8, 2010. The entire disclosures of the above patent applications are hereby incorporated by reference.

TECHNICAL FIELD

The present invention relates to a waste heat recovery device for use in an apparatus having a heat engine or a heat cycle.

DESCRIPTION OF THE RELATED ART

In order to effectively utilize waste heat in a heat engine or a heat cycle, it is carried out that heat energy contained in an exhaust gas is converted into kinetic energy by a turbine, and a compressor is driven by the kinetic energy to increase boost pressure. As a typical device for this purpose, a turbo charger is employed, and for example, a device described in Patent Document 1 is already known.

The invention described in Patent Document 1 is concerned with a failure diagnosis device equipped with detection means for respective parts in order to detect whether respective parts properly operate for points such as a degree of press down of an accelerator corresponding to an engine load signal and a position of a fuel lever which supplies a fuel to an engine, or to detect an operation state of a system as to whether a turbine rotation speed is normally obtained.

PRIOR ARTS

[Patent Document 1]
Japanese Patent Publication Laid-open No. H01-121514, "FAILURE DIAGNOSIS DEVICE FOR TURBO CHARGER WITH ROTATING ELECTRICAL MACHINE"

SUMMARY OF THE INVENTION

Problem to be Solved

Such a conventional turbo charger as described in Patent Document 1 usually has a structure in which a turbine and a compressor are mechanically connected by a shaft and rotate integrally.

However, because a rotation speed of the turbo charger is usually high (several tens of thousands or more rotations per minute), it is necessary to shorten the shaft as much as possible to prevent vibration of the shaft. Therefore, a pipe to carry an exhaust gas to the turbine and a pipe to feed air to the compressor are prolonged and curved. As a result, a pressure loss in the pipes increases and the pipes themselves occupy a large space.

Furthermore, in this case, there are some problems. That is, a heat insulator is often wrapped around the pipes, and hence a large amount of the heat insulator is required. In addition, wrapping the heat insulator around the curved pipes is cumbersome.

Moreover, because the turbine and the compressor rotate at the same rotation speed, there is the problem that one of the turbine or the compressor is operated under conditions which are not in the best conditions in terms of hydrodynamic performance, so that efficiency may be lowered.

The present invention has been developed in view of the above-mentioned problems. That is, an object of the present invention is to provide a waste heat recovery device which can shorten lengths of a pipe to carry an exhaust gas to a turbine and a pipe to feed air to a compressor, and can operate both the turbine and the compressor under the best conditions in terms of hydrodynamic performance.

Means to Solve the Problems

There is here provided a waste heat recovery device including a turbine driven by an exhaust gas and a compressor which compresses a gas, characterized by comprising:
a generator which generates electric power by rotation of the turbine;
an electric motor which rotationally drives the compressor; and
a control device which drives the electric motor by using the electric power as a power source.

In addition, according to the present invention, the control device comprises:
a rectifier which rectifies an alternate current output from the generator to convert the same into a direct current;
a smoothing circuit which smoothes a direct current voltage immediately after the rectifier;
a direct current bus which transfers the electric power from the turbine side to the compressor side;
an inverter which drives the electric motor;
a rotation speed detector which detects rotation speed of the turbine and the generator;
a voltage detector which detects a voltage of the direct current bus; and
a rotation speed command unit which outputs, to the inverter, rotation speed command value of the electric motor and the compressor which is calculated based on the rotation speed and the voltage.

Furthermore, according to another embodiment, the control device comprises:
a rectifier which rectifies and converts an alternate current output from the generator into a direct current;
a smoothing circuit which smoothes a direct current voltage immediately after the rectifier;
a direct current bus which transfers the electric power from the turbine side to the compressor side;
an inverter which drives the electric motor;
a rotation speed detector which detects the rotation speed of the turbine and the generator;
a direct current power source which supplies an electric current to the direct current bus;
a diode which supplies the electric current to the inverter, when generated voltage from the turbine and the generator is less than a voltage which enables the inverter to operate; and
a rotation speed command unit which outputs, to the inverter, rotation speed command value of the electric motor and the compressor which is calculated based on the rotation speed.

In addition, according to the present invention, for a pair of the turbine and the generator, a plurality of the electric motors and the compressors are provided.

Effects of the Invention

According to the above-mentioned invention, the turbine and the compressor can be arbitrarily disposed by mechanistically separating the turbine and the compressor into two sections, and hence it is possible to shorten and straighten the pipes for an exhaust gas and air feed. In addition, the turbine and the compressor may rotate at different rotation speeds, and hence both of the turbine and the compressor can be operated under the best conditions in terms of hydrodynamic performance.

DESCRIPTION OF EMBODIMENTS

Hereinafter, preferable embodiments of the present invention will be described with reference to the drawings. Additionally, in the respective drawings, common parts are denoted with the same reference signs, and repeated description is omitted.

Figure 1:
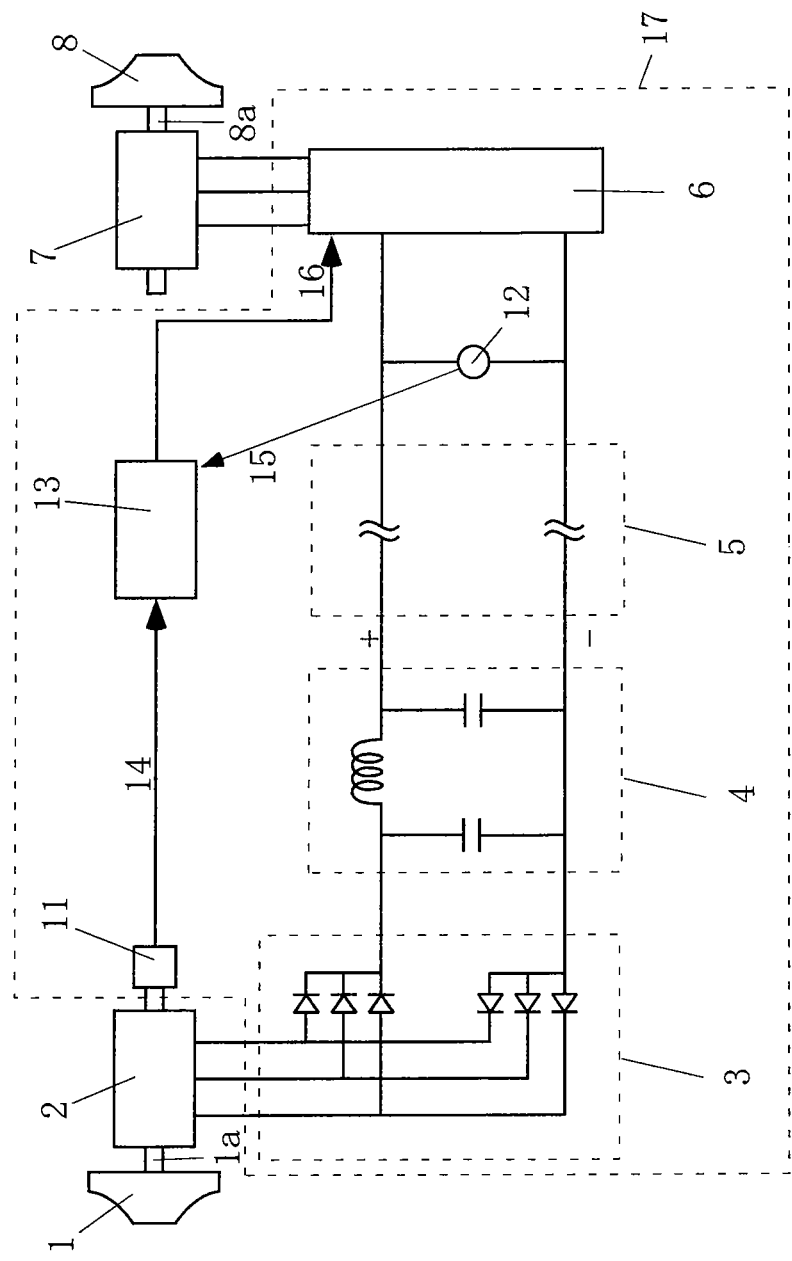
FIG. 1 is a view of a turbo charger of Embodiment 1 in the present invention.

FIG. 1 is a view of Embodiment 1 in the present invention.

In this drawing, 1 is a turbine, 1a is a shaft, 2 is a generator, 3 is a rectifier, 4 is a smoothing circuit, 5 is a direct current bus, 6 is an inverter, 7 is an electric motor, 8 is a compressor, 8a is a shaft, 11 is a rotation speed detector, 12 is a voltage detector, 13 is a rotation speed command unit, 14 is a rotation speed, 15 is a voltage, 16 is a rotation speed command value, and 17 is a control device.

The generator 2 is directly connected to the turbine 1 rotated by an exhaust gas from a heat engine (not shown) via the shaft 1a. Moreover, the generator 2 rotates integrally with the turbine 1 to generate electric power.

For example, a permanent magnet synchronous motor driven by a three-phase alternate current can be used as the generator 2.

The control device 17 drives the electric motor 7 by using the electric power generated by the generator 2 as a power source. Moreover, the control device 17 of the present embodiment includes the rectifier 3, the smoothing circuit 4, the direct current bus 5, the inverter 6, the rotation speed detector 11, the voltage detector 12, and the rotation speed command unit 13.

The rectifier 3 rectifies an alternate current output from the generator 2 to convert the same into a direct current.

For example, the rectifier 3 is constituted of a diode bridge or the like.

The smoothing circuit 4 smoothes a direct current voltage immediately after the rectifier 3, because the voltage has a ripple.

For example, the smoothing circuit 4 is constituted of a reactor and capacitors.

The direct current bus 5 transfers the electric power generated by the generator 2, from the turbine 1 side to the compressor 8 side.

For example, the direct current bus 5 is constituted of a cable, or a bus bar of a conductor such as copper or aluminum.

The inverter 6 drives the electric motor 7 at a variable speed in accordance with the rotation speed command value 16 from the rotation speed command unit 13.

For example, the inverter 6 is preferably a voltage or current type inverter using PWM modulation of a power control element such as an IGBT or a power MOS FET.

Moreover, as a method of driving the electric motor 7 at the variable speed, sensor-less vector control may be performed, or vector control may be performed by detecting the rotation of the electric motor 7 with an encoder or a resolver.

The electric motor 7 is directly connected to the compressor 8 which compresses air to be fed to the heat engine (not shown) via the shaft 8a, and when the electric motor 7 rotates, the compressor 8 rotates together.

For example, the electric motor 7 is constituted of an induction motor or a permanent magnet synchronous motor driven by a three-phase alternate current.

The rotation speed detector 11 detects the rotation speed 14 of the turbine 1 and the generator 2.

For example, as the rotation speed detector 11, there is used a tachogenerator or an encoder attached on the shaft 1a of the turbine 1 and the generator 2.

When the rotation speed detector 11 is the encoder, a rotation angle detected by the encoder is converted into the rotation speed 14 by time differentiating.

The voltage detector 12 detects the voltage 15 (the voltage between plus and minus) on the side of the direct current bus 5 which is closer to the inverter 6.

The rotation speed command unit 13 outputs, to the inverter 6, the rotation speed command value 16 of the electric motor 7 and the compressor 8, based on the rotation speed 14 of the turbine 1 and the generator 2 which is detected by the rotation speed detector 11, and the voltage 15 of the direct current bus 5 which is detected by the voltage detector 12.

The rotation speed command unit 13 can be constituted of, for example, a microprocessor, a memory and an operation program.

The rotation speed command unit 13 is configured to generate the rotation speed command value 16 as follows.

(1) When "the voltage 15 detected by the voltage detector 12" is lower than "the lowest voltage that enables the inverter 6 to operate", the rotation speed command value 16 is set to 0.

(2) When "the voltage 15 detected by the voltage detector 12" is equal to or higher than "the lowest voltage that enables the inverter 6 to operate", the rotation speed command value 16 is set to a value obtained by "the rotation speed 14 detected by the rotation speed detector 11"×a coefficient.

Here, for example, if efficiency enhances in terms of hydrodynamic performance when the rotation speed of the compressor 8 is equal to the rotation speed 14 of the turbine 1, then the coefficient is set to 1. For another example, if the efficiency enhances in terms of the hydrodynamic performance when the rotation speed of the compressor 8 is twice as much as the rotation speed 14 of the turbine 1, then the coefficient is set to 2. Moreover, for still another example, if the efficiency enhances in terms of the hydrodynamic performance when the rotation speed of the compressor 8 is 0.8 time as much as the rotation speed 14 of the turbine 1, then the coefficient is set to 0.8.

In summary, a ratio between the rotation speed of the compressor 8 and the rotation speed 14 of the turbine 1 at which the efficiency enhances most in terms of the hydrodynamic performance is used as the coefficient.

According to the above-mentioned configuration, when the heat engine (not shown) does not operate, the exhaust gas is not present, and hence the turbine 1 does not rotate. Therefore, the generator 2 of the same shaft as the turbine 1 does not rotate, and the voltage of the direct current bus 5 is 0. Therefore, "the voltage 15 detected by the voltage detector 12" is lower than "the lowest voltage that enables the inverter 6 to operate", and hence the rotation speed command value 16 becomes 0. The electric motor 7 does not rotate, and the compressor 8 of the same shaft as the electric motor 7 does not rotate either.

On the other hand, when the heat engine (not shown) operates, the exhaust gas is generated to rotate the turbine 1. Consequently, the generator 2 of the same shaft as the turbine 1 also rotates, and the voltage of the direct current bus 5 rises. When "the voltage 15 detected by the voltage detector 12" becomes above "the lowest voltage that enables the inverter 6 to operate", the rotation speed command value 16 becomes not zero, and by the vector control in the inverter 6, the electric motor 7 rotates at the rotation speed corresponding to the rotation speed command value 16. Then, the compressor 8 of the same shaft as the electric motor 7 also rotates, and the air to be fed to the heat engine is compressed.

The rotation speed command value 16 is in proportion to the rotation speed 14 detected by the rotation speed detector 11, and hence when the turbine 1 rotates at a low speed, the compressor 8 also rotates at the low speed. When the turbine 1 rotates at a high speed, the compressor 8 also rotates at the high speed. Therefore, when the heat engine (not shown) operates, the operation becomes similar to that of a conventional turbo charger in which the turbine is directly connected to the compressor via the shaft.

Furthermore, the rotation speed command value 16 is "the rotation speed 14 detected by the rotation speed detector 11"×the coefficient. Therefore, when it is preferable in terms of the hydrodynamic performance that the ratio between the rotation speed 14 of the turbine 1 and the rotation speed of the compressor 8 is, for example, X-times, a value of the coefficient is set to X, whereby the operation can be performed so that the rotation speed of the compressor 8 is X-times as much as the rotation speed 14 of the turbine 1.

Figure 2:
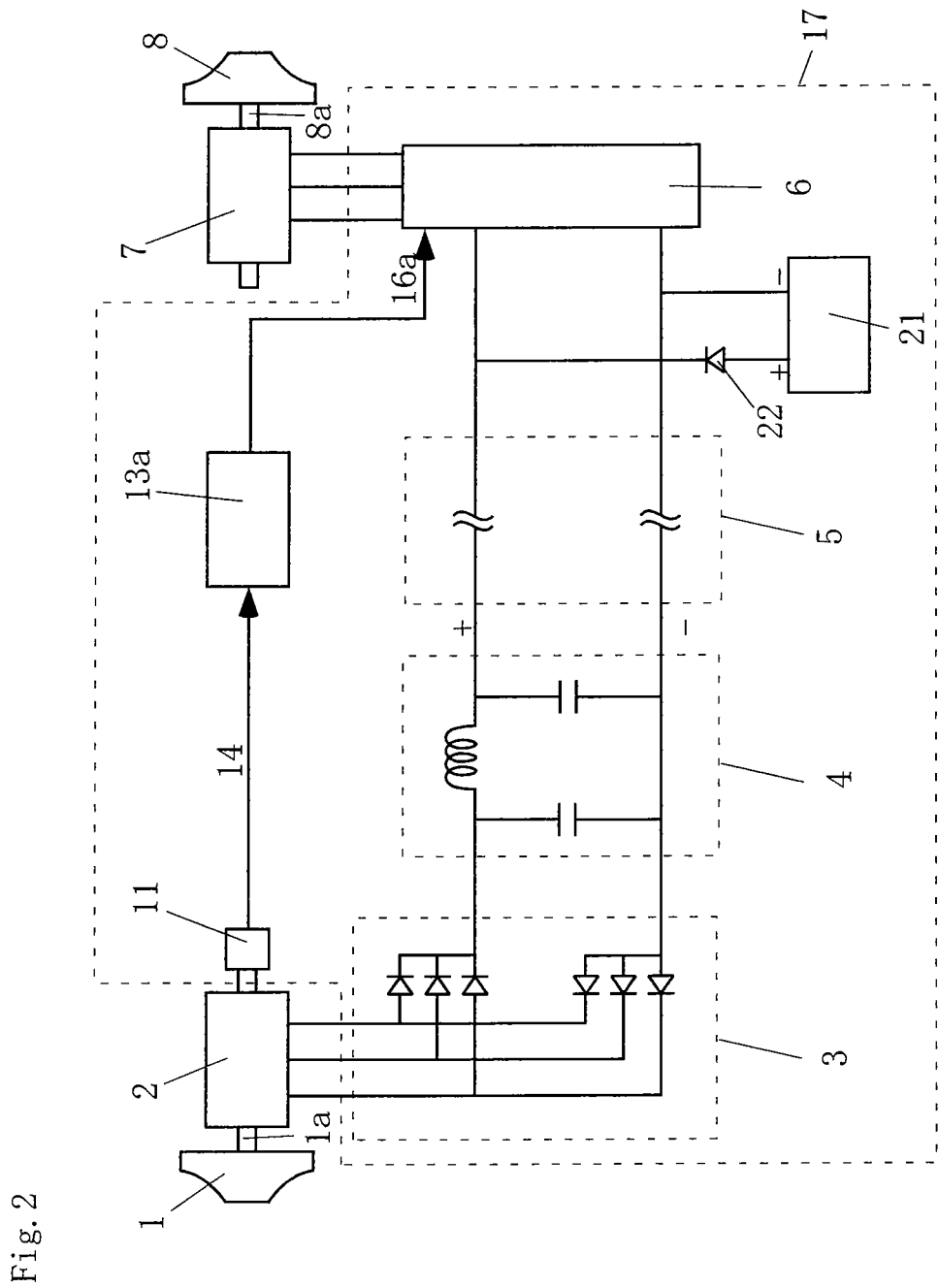
FIG. 2 is a view of a turbo charger of Embodiment 2 in the present invention.

FIG. 2 is a view of a turbo charger of Embodiment 2 in the present invention.

In this drawing, 13a is a rotation speed command unit, 16a is a rotation speed command value, 21 is a direct current power source, and 22 is a diode. The same constituent elements as those of Embodiment 1 are denoted with the same reference signs as in FIG. 1, and description is omitted.

A control device 17 drives an electric motor 7 by using electric power generated by a generator 2 as a power source. Moreover, the control device 17 of the present embodiment includes a rectifier 3, a smoothing circuit 4, a direct current bus 5, an inverter 6, a rotation speed detector 11, the rotation speed command unit 13a, the direct current power source 21, and the diode 22.

The rotation speed command unit 13a outputs, to the inverter 6, the rotation speed command value 16a of the electric motor 7 and a compressor 8 based on rotation speed 14 of a turbine 1 and the generator 2 which is detected by the rotation speed detector 11.

The direct current power source 21 supplies a larger voltage than "the lowest voltage that enables the inverter 6 to operate". For example, a secondary battery or an electric double layer capacitor may be used, or a configuration of rectifying, smoothing and voltage-regulating a commercial alternate current power source may be used.

The diode 22 is automatically switched so that only when voltage generated by the turbine 1 and the generator 2 is low, an electric current is supplied from the direct current power source 21 to the direct current bus 5, and when sufficient voltage is generated by the turbine 1 and the generator 2, the electric current is supplied from the generator 2 to the direct current bus 5.

The direct current power source 21 is connected to the diode 22 as shown in FIG. 2, and hence "the lowest voltage that enables the inverter 6 to operate" or a higher voltage is constantly applied to the direct current bus 5, so that the inverter 6 can constantly operate.

The rotation speed command unit 13a is configured to generate the rotation speed command value 16a as follows.

(1) When "the rotation speed 14 detected by the rotation speed detector 11" is smaller than a constant R1, the rotation speed command value 16a is set to a constant R2.

(2) When "the rotation speed 14 detected by the rotation speed detector 11" is equal to or higher than the constant R1, the rotation speed command value 16a is set to "the rotation speed 14 detected by the rotation speed detector 11"×a coefficient.

Here, the constant R1 is the rotation speed 14 of the turbine 1 corresponding to a state where a heat engine (not shown) is in an idle state and the power generation by the generator 2 of the same shaft as the turbine 1 is hardly performed. The constant R2 is the rotation speed of the compressor 8 which is required to perform minimum air feed.

Additionally, the above coefficient is obtained similarly to Embodiment 1.

According to the above-mentioned configuration, when the heat engine does not operate or the heat engine operates but is in the idle state, less exhaust gas is present, and the rotation speed 14 of the turbine 1 is low, which therefore corresponds to a case where "the rotation speed 14 detected by the rotation speed detector 11" is smaller than the constant R1. The rotation speed command value 16a is the constant R2, and the compressor 8 only performs the minimum air feed. Since the power generation from the generator 2 of the same shaft as the turbine 1 is hardly performed, an electric current flow into the direct current bus 5 from the direct current power source 21 through the diode 22, to drive the inverter 6.

On the other hand, when the heat engine operates to drive a load, more exhaust gas is present, and the rotation speed 14 of the turbine 1 is high, which therefore corresponds to a case where "the rotation speed 14 detected by the rotation speed detector 11" is equal to or higher than the constant R1. Consequently, the operation is the same as that in a case where "the heat engine operates" in Embodiment 1.

Embodiment 2 is especially suitable for a case where the minimum air feed is to be maintained (the compressor 8 is not to be stopped), even when a frequency to perform the idle operation of the heat engine or stop the engine is high.

Figure 3:
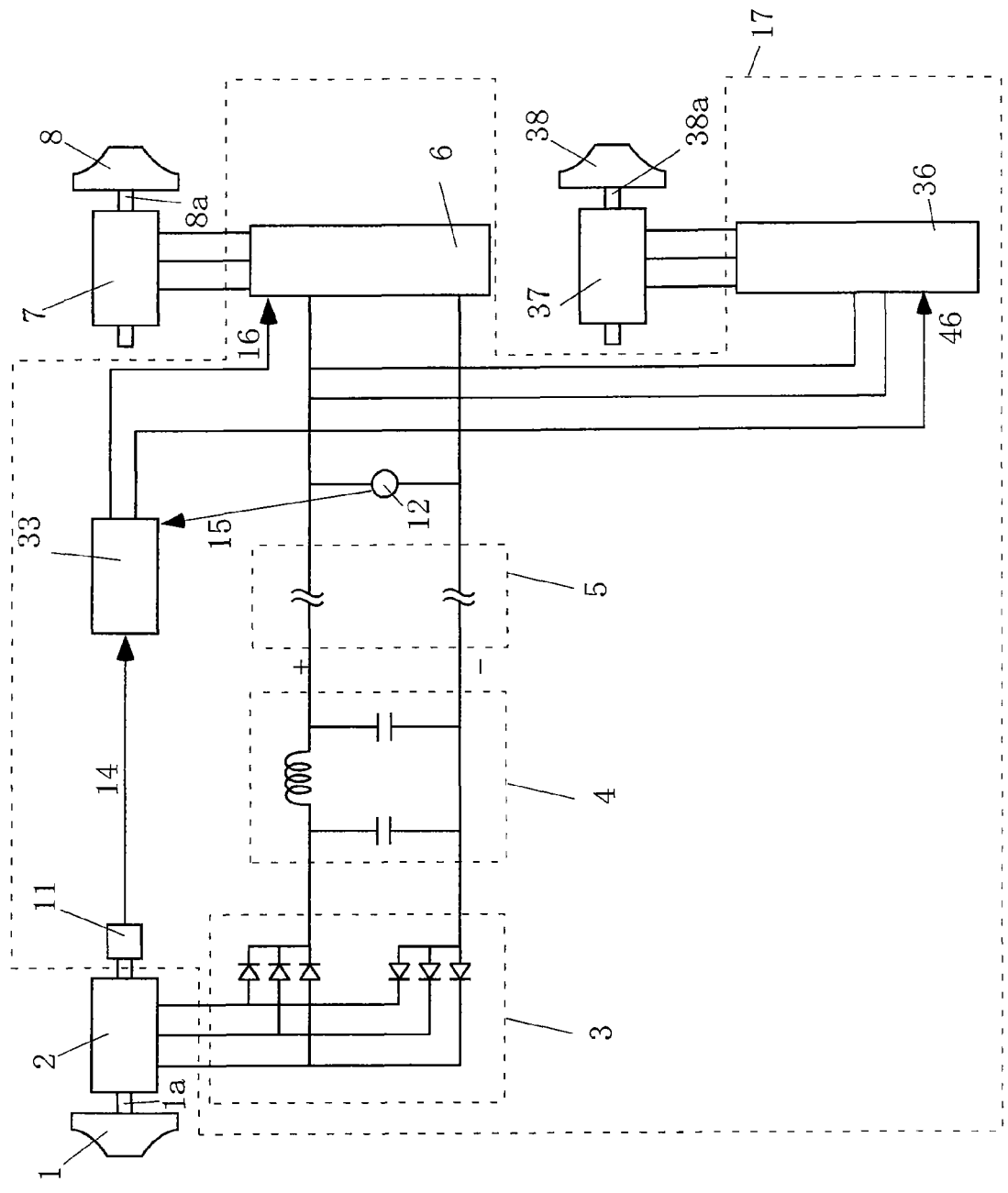
FIG. 3 is a view of a turbo charger of Embodiment 3 in the present invention.

FIG. 3 is a view of a turbo charger of Embodiment 3 in the present invention.

In this drawing, 33 is a rotation speed command unit, 36 is an inverter, 37 is an electric motor, 38 is a compressor, and 38a is a shaft. The same constituent elements as those of Embodiment 1 are denoted with the same reference signs as in FIG. 1, and description is omitted.

A control device 17 drives electric motors 7 and 37 by using electric power generated by a generator 2 as a power source. Moreover, the control device 17 of the present embodiment includes a rectifier 3, a smoothing circuit 4, a direct current bus 5, inverters 6 and 36, a rotation speed detector 11, a voltage detector 12, and the rotation speed command unit 33.

The rotation speed command unit 33 outputs, to the inverters, rotation speed command values of the electric motors and the compressors for each of a plurality of sets of the electric motors, the compressors and the inverters, based on rotation speed 14 of a turbine 1 and the generator 2 which is detected by the rotation speed detector 11, and a voltage of the direct current bus 5 which is detected by the voltage detector 12. That is, rotation speed command value 16 of the electric motor 7 and a compressor 8 is output to the inverter 6, and rotation speed command value 46 of the electric motor 37 and the compressor 38 is output to the inverter 36.

The rotation speed command unit 33 can be constituted of, for example, a microprocessor, a memory and an operation program.

The inverter 36, the electric motor 37, the compressor 38 and the shaft 38a have the same mechanism as in the inverter 6, the electric motor 7, the compressor 8 and a shaft 8a in Embodiment 1 or Embodiment 2. Dimensions, shapes or the rotation speeds may be different.

In this embodiment, for a pair of the turbine 1 and the generator 2, there are prepared a plurality of the compressors 8 and 38 and the electric motors 7 and 37 which compress the air to be fed to a plurality of heat engines or heat cycles (not shown) or a plurality of divided parts thereof, and the electric power generated by the generator 2, which is electrically connected to the plurality of electric motors 7 and 37.

The rotation speed command unit 33 is configured to generate the rotation speed command value 16 as follows.

(1) When "a voltage 15 detected by the voltage detector 12" is lower than "the lowest voltage that enables the inverter 6 to operate", the rotation speed command value 16 is set to 0.

(2) When "the voltage 15 detected by the voltage detector 12" is equal to or higher than "the lowest voltage that enables the inverter 6 to operate", the rotation speed command value 16 is set to a value obtained by "the rotation speed 14 detected by the rotation speed detector 11"×a coefficient A.

Here, for example, if efficiency enhances in terms of hydrodynamic performance when the rotation speed of the compressor 8 is equal to the rotation speed 14 of the turbine 1, then the coefficient A is set to 1. For another example, if the efficiency enhances in terms of the hydrodynamic performance when the rotation speed of the compressor 8 is twice as much as the rotation speed 14 of the turbine 1, then the coefficient A is set to 2. Moreover, for still another example, if the efficiency enhances in terms of the hydrodynamic performance when the rotation speed of the compressor 8 is 0.8 time as much as the rotation speed 14 of the turbine 1, then the coefficient A is set to 0.8.

In summary, a ratio between the rotation speed of the compressor 8 and the rotation speed 14 of the turbine 1 at which the efficiency enhances most in terms of the hydrodynamic performance is used as the coefficient A.

Furthermore, the rotation speed command unit 33 is configured to generate the rotation speed command value 46 as follows.

(1) When "the voltage 15 detected by the voltage detector 12" is lower than "the lowest voltage that enables the inverter 36 to operate", the rotation speed command value 46 is set to 0.

(2) When "the voltage 15 detected by the voltage detector 12" is equal to or higher than "the lowest voltage that enables the inverter 36 to operate", the rotation speed command value 46 is set to a value obtained by "the rotation speed 14 detected by the rotation speed detector 11"×a coefficient B.

Here, for example, if the efficiency enhances in terms of the hydrodynamic performance when the rotation speed of the compressor 38 is equal to the rotation speed 14 of the turbine 1, then the coefficient B is set to 1. For another example, if the efficiency enhances in terms of the hydrodynamic performance when the rotation speed of the compressor 38 is twice as much as the rotation speed 14 of the turbine 1, then the coefficient B is set to 2. Moreover, for still another example, if the efficiency enhances in terms of the hydrodynamic performance when the rotation speed of the compressor 38 is 0.8 time as much as the rotation speed 14 of the turbine 1, then the coefficient B is set to 0.8.

In summary, a ratio between the rotation speed of the compressor 38 and the rotation speed 14 of the turbine 1 at which the efficiency enhances most in terms of the hydrodynamic performance is used as the coefficient B.

Figure 4:
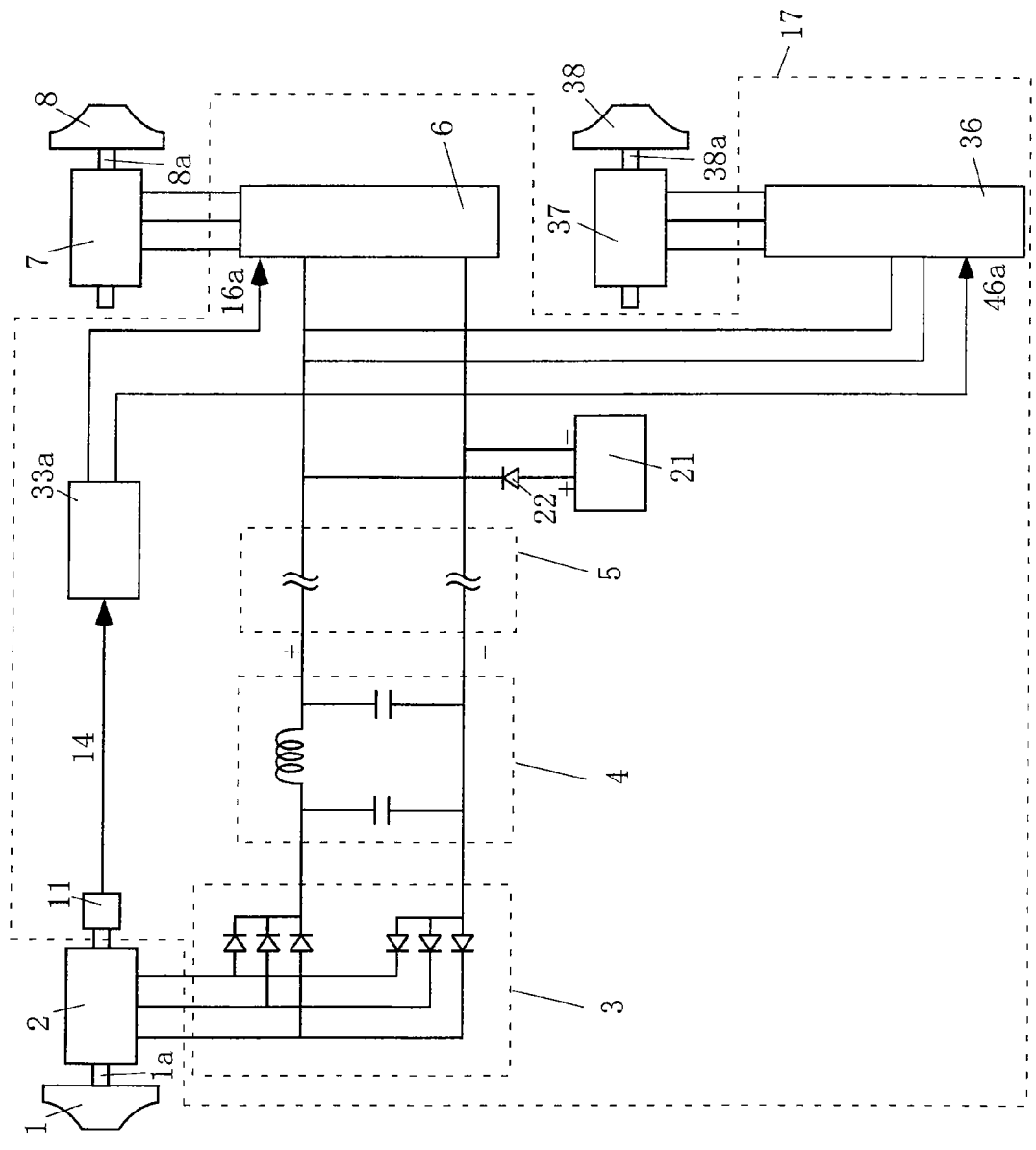
FIG. 4 is a view of a turbo charger of Embodiment 4 in the present invention.

FIG. 4 is a view of a turbo charger of Embodiment 4 in the present invention.

In this drawing, 33a is a rotation speed command unit. The same constituent elements as those of Embodiments 2 and 3 are denoted with the same reference signs as in FIG. 2 and FIG. 3, and description is omitted.

A control device 17 drives electric motors 7 and 37 by using electric power generated by a generator 2 as a power source. Moreover, the control device 17 of the present embodiment includes a rectifier 3, a smoothing circuit 4, a direct current bus 5, inverters 6 and 36, a rotation speed detector 11, the rotation speed command unit 33a, a direct current power source 21, and a diode 22.

The rotation speed command unit 33a outputs, to the inverters, rotation speed command values of the electric motors and the compressors for each of a plurality of sets of the electric motors, the compressors and the inverters, based on rotation speed 14 of a turbine 1 and the generator 2 which is detected by the rotation speed detector 11. That is, rotation speed command value 16a of the electric motor 7 and a compressor 8 is output to the inverter 6, and rotation speed command value 46a of the electric motor 37 and a compressor 38 is output to the inverter 36.

The rotation speed command unit 33a is configured to generate the rotation speed command value 16a as follows.

(1) When "the rotation speed 14 detected by the rotation speed detector 11" is smaller than a constant R1, the rotation speed command value 16a is a constant R2A.

(2) When "the rotation speed 14 detected by the rotation speed detector 11" is equal to or higher than the constant R1, the rotation speed command value 16a is set to "the rotation speed 14 detected by the rotation speed detector 11"×a coefficient A.

Here, the constant R2A is the rotation speed of the compressor 8 which is required to perform minimum air feed.

Furthermore, the rotation speed command unit 33a is configured to generate the rotation speed command value 46a as follows.

(1) When "the rotation speed 14 detected by the rotation speed detector 11" is smaller than the constant R1, the rotation speed command value 46a is a constant R2B.

(2) When "the rotation speed 14 detected by the rotation speed detector 11" is equal to or higher than the constant R1, the rotation speed command value 46a is set to "the rotation speed 14 detected by the rotation speed detector 11"×a coefficient B.

Here, the constant R2B is the rotation speed of the compressor 38 which is required to perform minimum air feed.

Additionally, the constant R1 is obtained similarly to Embodiment 2, and the coefficients A and B are obtained similarly to Embodiment 3.

In Embodiment 3 and Embodiment 4, an exhaust gas obtained by combining exhaust gases from a plurality of heat engines or heat cycles or a plurality of divided parts thereof constantly drives the turbine 1, and a communication pipe for compensation of exhaust gas unbalance becomes unnecessary.

Moreover, for example, when a common exhaust gas treatment device is disposed for the plurality of heat engines or heat cycles or the plurality of divided parts thereof to cope with environmental regulations, a high pressure exhaust gas passes through pipes prior to passing through the turbine, so that the smaller-diameter pipes can be used.

Additionally, in the present invention, when a distance between the turbine 1 and the compressor 8 is large, to decrease a voltage drop in an electric wire, a booster type DC-DC converter may be additionally disposed immediately after the smoothing circuit 4, and the voltage may be raised.

Moreover, to prevent an overvoltage, a regenerative resistance is additionally interposed between plus and minus of the direct current bus 5 via a contactor, and when the voltage of the direct current bus 5 is in excess of an input allowable voltage of the inverter 6, the contactor may be closed.

The rotation speed of the turbine 1 and the generator 2 may be detected by counting zero cross points of an alternate current output of the generator 2. In this case, it is not necessary to dispose an external tachogenerator or encoder.

Furthermore, in Embodiment 3 and Embodiment 4, there has been described the example where two sets of the electric motors, compressors and inverters are provided, but a similar configuration is possible when three sets or more are disposed.

It is to be noted that the present invention is not limited to the above-mentioned embodiments, and needless to say, various modifications can be added without departing from the scope of the present invention.

Explanation of Reference Numerals 1 turbine, 1a shaft, 2 generator, 3 rectifier, 4 smoothing circuit, 5 direct current bus, 6 inverter, 7 electric motor, 8 compressor, 8a shaft, 11 rotation speed detector, 12 voltage detector, 13 rotation speed command unit, 13a rotation speed command unit, 14 rotation speed of turbine and generator, 15 voltage, 16 rotation speed command value, 16a rotation speed command value, 17 control device, 21 direct current power source, 22 diode, 33 rotation speed command unit, 33a rotation speed command unit, 36 inverter, 37 electric motor, 38 compressor, 38a shaft, 46 rotation speed command value46a rotation speed command value.

The invention claimed is:

1. A waste heat recovery device including a gas compressor which compresses a gas, and a turbine driven by an exhaust gas, comprising:
  an alternating current generator operably connected to the turbine;
  an electric motor operably connected to drive the compressor; and
  a control device operably connected to the electric motor, wherein the control device comprises:
    a rectifier operably connected to the output of the alternating current generator,
    a DC smoothing circuit operably connected to the output of the rectifier,
    an inverter arranged to drive the electric motor,
    a direct current bus operatively connected to transfer electric power from the alternating current generator to the electric motor,
    a rotation speed detector operably connected to the turbine and the alternating current generator, wherein the rotation speed detector is arranged to detect rotation speed of the turbine and the alternating current generator,
    a voltage detector, the voltage detector operatively arranged to detect a voltage of the current bus,
    a rotation speed command unit operably connected to the rotation speed detector and the inverter, the rotation speed command unit arranged to output a rotation speed command value to the inverter in response to the rotation speed of the alternating current generator, the inverter being arranged to drive the electric motor at a variable speed in accordance with the rotation speed command value from the rotation speed command unit.

2. A waste heat recovery device including a gas compressor which compresses a gas, and a turbine driven by an exhaust gas, comprising:
  an alternating current generator operably connected to the turbine;
  an electric motor operably connected to drive the compressor; and
  a control device operably connected to the electric motor, wherein the control device comprises:
    a rectifier operably connected to the output of the alternating current generator,
    a DC smoothing circuit operably connected to the output of the rectifier,
    an inverter arranged to drive the electric motor,
    a direct current bus operatively connected to transfer electric power from the alternating current generator to the electric motor,
    a rotation speed detector operably connected to the turbine and the alternating current generator, wherein the rotation speed detector is arranged to detect rotation speed of the turbine and the alternating current generator,
    a voltage detector, the voltage detector being arranged to detect a voltage of the current bus,
    a rotation speed command unit operably connected to the rotation speed detector and the inverter, the rotation speed command unit arranged to output a rotation speed command value to the inverter in response to the rotation speed of the alternating current generator, the inverter being arranged to drive the electric motor at a variable speed in accordance with the rotation speed command value from the rotation speed command unit; and
  a direct current power source arranged to provide electric current to the direct current bus via a diode, wherein the diode has a cathode side and an anode side, wherein either the anode side of the diode is connected to a positive side of the direct current power source and the cathode side of the diode is connected to a positive side of the direct current bus, or the cathode side of the diode is connected to a negative side of the direct current power source and the anode side of the diode is connected to a negative side of the direct current bus.

3. The waste heat recovery device according to claim 1, wherein for a pair of the turbine and the alternating current generator, a plurality of pairs of electric motors and the compressors are provided.

4. The waste heat recovery device according to claim 2, wherein for a pair of the turbine and the alternating current generator, a plurality of pairs of electric motors and the compressors are provided.

5. The waste heat recovery device according to claim 1, wherein the rotation speed command unit is configured to generate a rotation speed command value as follows:
  (A) when the voltage detected by the voltage detector is lower than the lowest voltage that enables the inverter to operate, the rotation speed command value is set to 0,
  (B) when the voltage detected by the voltage detector is equal to or higher than the lowest voltage that enables the inverter to operate, the rotation speed command value is set to a value obtained by the rotation speed detected by the rotation speed detector multiplied by a coefficient, wherein the value of the coefficient is the ratio between the rotation speed of the compressor and the rotation speed of the turbine at maximum hydrodynamic performance.

6. The waste heat recovery device according to claim 2, wherein the rotation speed command unit is configured to generate a rotation speed command value as follows:
   (A) when the voltage detected by the voltage detector is lower than the lowest voltage that enables the inverter to operate, the rotation speed command value is set to 0,
   (B) when the voltage detected by the voltage detector is equal to or higher than the lowest voltage that enables the inverter to operate, the rotation speed command value is set to a value obtained by the rotation speed detected by the rotation speed detector multiplied by a coefficient, wherein the value of the coefficient is the ratio between the rotation speed of the compressor and the rotation speed of the turbine at maximum hydrodynamic performance.

* * * * *